US012179216B2

(12) United States Patent
Stollings et al.

(10) Patent No.: US 12,179,216 B2

(45) Date of Patent: Dec. 31, 2024

(54) SYSTEM AND METHOD FOR SEPARATING MATERIAL

(71) Applicant: Rare Elements of the World, LLC, Irving, TX (US)

(72) Inventors: James Daniel Stollings, Charleston, WV (US); Jack Perry Queener, Summerville, WV (US)

( * ) Notice: Subject to any disclaimer, the term of this patent is extended or adjusted under 35 U.S.C. 154(b) by 349 days.

(21) Appl. No.: 17/515,450

(22) Filed: Oct. 30, 2021

(65) Prior Publication Data

US 2022/0134354 A1 May 5, 2022

Related U.S. Application Data

(60) Provisional application No. 63/108,242, filed on Oct. 30, 2020.

(51) Int. Cl.

| | |
|---|---|
| ***B03C 1/03*** | (2006.01) |
| ***B03C 1/005*** | (2006.01) |
| ***B03C 1/033*** | (2006.01) |

(52) U.S. Cl.

CPC .............. *B03C 1/033* (2013.01); *B03C 1/005* (2013.01); *B03C 2201/18* (2013.01)

(58) Field of Classification Search

CPC ................................ B03C 1/005; B03C 1/033

See application file for complete search history.

(56) References Cited

U.S. PATENT DOCUMENTS

| | | | | |
|---|---|---|---|---|
| 4,961,843 | A * | 10/1990 | Lewis | B03B 5/623 209/210 |
| 6,578,783 | B2 | 6/2003 | Simon et al. | |
| 6,599,434 | B2 | 7/2003 | Mullins | |
| 6,666,335 | B1 * | 12/2003 | Bradley | B03B 9/04 241/24.1 |
| 8,409,305 | B2 | 4/2013 | Botte | |
| 9,539,581 | B2 | 1/2017 | Pickens et al. | |
| 10,569,281 | B2 | 2/2020 | Valerio | |
| 11,071,987 | B2 | 7/2021 | Fritz et al. | |
| 2017/0209870 | A1 | 7/2017 | Valerio | |
| 2022/0134354 | A1 * | 5/2022 | Stollings | B03C 1/033 210/223 |

FOREIGN PATENT DOCUMENTS

KR 101929802 3/2019

OTHER PUBLICATIONS

International Search Report issued for PCT/US2021/057475 mailed Feb. 2, 2022.

(Continued)

*Primary Examiner* — Sharon Pregler

(74) *Attorney, Agent, or Firm* — THE BRICKELL IP GROUP; A. Robert Weaver; Rafael Perez Perino

(57) ABSTRACT

A method and system for separating valuable material, such as precious metals and rare earth elements, from a raw material, such as coal, is disclosed. The system may include a crusher or pulverizer for producing finely crushed material. This crushed material may be made into a slurry and placed into an econosizer for separating material by its specific gravity. High specific gravity material may be further refined using magnets, separators, or centrifuges, among other disclosed components of the system.

16 Claims, 6 Drawing Sheets

(56) References Cited

OTHER PUBLICATIONS

Written Opinion issued for PCT/US2021/057475 mailed Feb. 2, 2022.
International Preliminary Report on Patentability issued for PCT/US2021/057475 mailed May 11, 2023.
Franus et al., "Coal fly ash as a resource for rare earth elements," Environmental Science Research Pollution, 9464-9474, published Jan. 24, 2015.
Taggart et al., "Effects of roasting additives and leaching parameters on the extraction of rare earth elements from coal fly ash," International Journal of Coal Geology, Jun. 2018.
Balaram, "Rare earth elements: a review of applications, occurrence, exploration, analysis, recycling, and environmental impact," National Geophysical Research Institute, 1285-1303, published Mar. 12, 2019.
Alvin et al., "The future of rare earth elements may lie with coal," American Coal Counsel, published Nov. 17, 2017.
Kane, "Could Coal become a major source of lithium? Geochemists think so," insidedeevs.com, published Apr. 6, 2015.
Qin et al., "Review of coal as a promising source of lithium," International Journal of Oil, Gas and Coal Technology, Mar. 18, 2015.
Industrial Specialties Mfg., and IS Med Specialties, "Mesh and Micron Sizes," Mar. 11, 2020.

* cited by examiner

SYSTEM AND METHOD FOR SEPARATING MATERIAL

CROSS REFERENCE TO RELATED APPLICATIONS

This application claims priority to U.S. Provisional Application No. 63/108,242 filed Oct. 30, 2020, the entire contents of which are hereby incorporated by reference.

FIELD OF THE DISCLOSURE

This disclosure relates generally to systems and methods for separating or extracting materials, and more specifically to removing rare earth elements and other valuable material from raw material such as coal, coal waste rock, strata overlying the coal seam, the strata directly beneath the coal seam, carbonatites, alkaline igneous systems, ioan-adsorption clay deposits, monazite, pegmatites, sediments of ocean bottom and other sources of raw material.

BACKGROUND

Coal and coal byproducts have recently emerged as a promising source of rare earth elements and precious metals. Rare earth elements, including yttrium, scandium, lithium, and the lanthanide series of elements, are a group of eighteen elements that have similar chemical properties. They also have high value due to their increased usage in a variety of modern technologies. They are also scarce due to their geochemical properties which render them unlikely to be found in large ore deposits. Precious metals such as silver and gold are also experiencing increasing demand and value. Current systems and methods for extracting or separating these valuable materials tend to be overly reliant on chemical treatments, which have many disadvantages including being harmful to the environment. Thus, new and improved systems and methods for extracting or separating these valuable materials from coal and other raw materials are highly desirable, particularly environmentally friendly methods and systems.

SUMMARY OF THE DISCLOSURE

The following presents a simplified summary of the disclosure in order to provide a basic understanding of some aspects of the various embodiments disclosed herein. This summary is not an extensive overview of every detail of every embodiment. It is intended to neither identify key or critical elements of every embodiment nor delineate the scope of every disclosed embodiment. Its sole purpose is to present some concepts of disclosure in a simplified form as a prelude to the more detailed description that is presented later.

In one embodiment of the disclosure, a system for separating a plurality of valuable materials from a raw material may include one or more crushers for reducing the raw material to a crushed material being 60 mesh or finer in size. The system may also include a mixing tank fro combining the crushed material with water to produce a slurry, an econosizer for separating high specific gravity material from low specific gravity material within the slurry, a low specific gravity circuit for extracting a first valuable material from the low specific gravity material, and a high specific gravity circuit for extracting a second valuable material form the higher specific gravity material.

In another embodiment of the disclosure, a method for separating a plurality of valuable material from a raw material may include crushing the raw material to a size of 60 mesh or finer, creating a slurry from the crushed material and water, separating high specific gravity material from low specific gravity material form the slurry through an econosizer, processing the low specific gravity material through a low specific gravity circuit in order to extract a first valuable material, and processing the high specific gravity material through a high specific gravity circuit in order to extract a second valuable material.

The following description and annexed drawings set forth certain illustrative aspects of the disclosure. These aspects are indicative, however, of but a few of the various ways in which the principles disclosed may be employed. Other advantages and novel features disclosed herein will become apparent from the following description when considered in conjunction with the drawings

DETAILED DESCRIPTION OF THE DISCLOSURE

Figure 1:
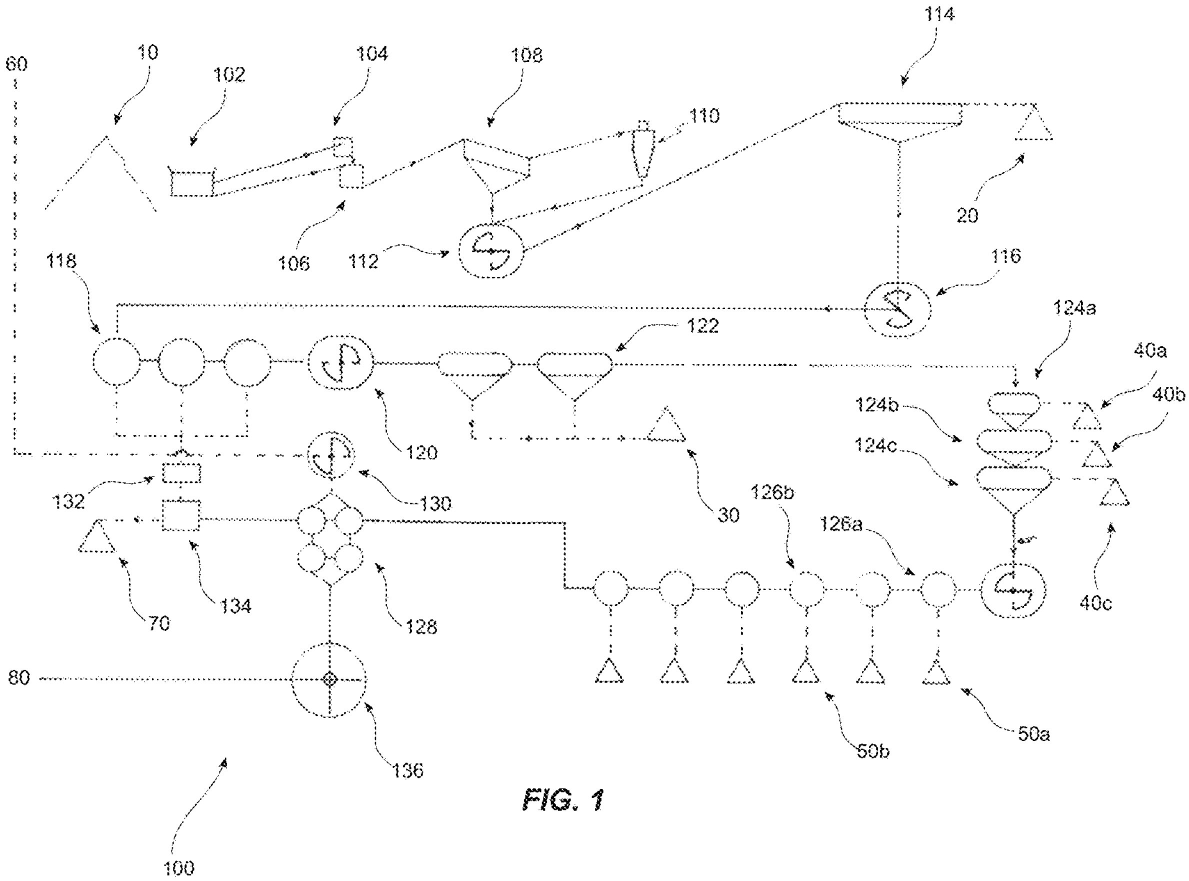
FIG. 1 illustrates an embodiment of a material separation system.

The following detailed description and the appended drawings describe and illustrate some embodiments for the purpose of enabling one of ordinary skill in the relevant art to make use the invention. As such, the detailed description and illustration of these embodiments are purely illustrative in nature and are in no way intended to limit the scope of the invention, or its protection, in any manner. It should also be understood that the drawings are not necessarily to scale and in certain instances details may have been omitted, which are not necessary for an understanding of the disclosure, such as details of fabrication and assembly. In the accompanying drawings, like numerals represent like components.

In one embodiment of the disclosure, a system for separating a plurality of valuable materials from a raw material may include one or more crushers for reducing the raw material to a crushed material being 60 mesh or finer in size. The system may also include a mixing tank fro combining the crushed material with water to produce a slurry, an econosizer for separating high specific gravity material from low specific gravity material within the slurry, a low specific gravity circuit for extracting a first valuable material from the low specific gravity material, and a high specific gravity circuit for extracting a second valuable material form the higher specific gravity material.

In further embodiments of a system, the crushed material may be 325 mesh or finer in size. The one or more crushers may be an air crusher. The system may further include a medium specific gravity circuit for extracting a third valuable material from a medium specific gravity material separated from the econosizer. The medium specific gravity circuit may include a lithium tank and the third valuable material may be lithium, scandium, or vanadium. The high specific gravity circuit may be for extracting a fourth valuable material, and the high specific gravity circuit further includes a first magnet having sufficient magnetic strength to forcibly separate the second valuable material from the slurry but not the third valuable material, and the second magnet having sufficient magnetic strength to forcibly separate the fourth valuable material from the slurry. The second magnet may be a wet high intensity magnetic separator, the second valuable material may be ferrous material, and the fourth valuable material may be a rare earth element. The high specific gravity circuit may be for further extracting a fifth valuable material, the high specific gravity circuit may include a centrifuge operable to separate the fifth valuable material from the slurry after the passing through the first and second magnets. The fifth valuable material may be a light rare earth element, a heavy rare earth element, or a precious metal. The raw material may be coal.

In another embodiment of the disclosure, a method for separating a plurality of valuable material from a raw material may include crushing the raw material to a size of 60 mesh or finer, creating a slurry from the crushed material and water, separating high specific gravity material from low specific gravity material form the slurry through an econosizer, processing the low specific gravity material through a low specific gravity circuit in order to extract a first valuable material, and processing the high specific gravity material through a high specific gravity circuit in order to extract a second valuable material.

In further embodiments of a method, the crushing may be to crush the raw material to size of 325 mesh or finer. The crushing may occur by an air crusher. The method may include separating medium specific gravity material form the slurry through the econosizer, and processing the medium specific gravity material through a medium specific gravity circuit in order to extract a third valuable material. The medium specific gravity circuit may include a lithium tank, and the third valuable material may be lithium, scandium, or vanadium. Processing the high specific gravity material may be to further extract a fourth valuable material. The high specific gravity circuit may include a first magnet having sufficient magnetic strength to forcibly separate the second valuable material from the slurry but not the third valuable material, and the second magnet may have sufficient magnetic strength to forcibly separate the fourth valuable material from the slurry. The second magnet may be a wet high intensity magnetic separator, the second valuable material may be a ferrous material, and the fourth valuable material may be a rare earth element. Processing the high specific gravity may further extract a fifth valuable material. The high specific gravity circuit may include a centrifuge operable to separate the fifth valuable material from the slurry after passing through the first and second magnets. The fifth valuable material is a light rare earth element, a heavy rare earth element, or a precious metal. The raw material may be coal.

Referring now to FIG. 1, an embodiment of a material separation system 100 for use with removing material embedded, laced, intertwined, or otherwise included with a base or raw material 10. The embodiments described herein are typically with respect to removing material from coal 10. However, one of ordinary skill in the art would appreciate that the system and techniques disclosed herein may be applied to removing material from raw material other than coal. For the instance, raw material 10 may include carbonites, of which coal is a member. Raw material may also include alkaline igneous systems, ion-adsorption clay deposits, or monazite-xenotime-bearing placer deposits.

Coal 10 or other raw material may be trucked or transported to a processing site where system 100 is located. Coal 10 may be transferred to a preliminary feeder 102, which may include a screen to separate large lump coal versus small lump coal. For example, coal having a width greater than ¼ inches may be separately fed to a crusher 104 before passing to a hammer mill 106 whereas smaller lumps of coal may be screened in the feeder 102 and sent directly to hammer mill 106. In one embodiment, crusher 104 may be an Eagle Crusher® capable of accepting coal lumps as a large as 24 inches.

Crushed coal 10 may then be fed into an air classifier 108, which may operate to separate out crushed coal larger than ¼ inch by +30 microns from smaller crushed material. The larger material be sent to an air crusher or pulvarizer 110 for further processing and reduction of size. In one embodiment, pulvarizer 110 may be powered by one or more twenty-two 300 horsepower air compressors operable to crush the feedstock of raw material 10 to a 300 by zero or −300 mesh product. The pulverized material may then be rejoined with smaller material separated by air classifier 108 in mixing tanks 112 to create a slurry. In some embodiments, mixing tanks 112 may be leaching tanks.

The slurry may then be pumped into an econosizer 114, which is a particle separator known in the industry to permit smaller or coarse size particles to pass down a hopper towards the device's lower end. One such known econosizer is disclosed in U.S. Pat. Nos. 4,961,843 and 6,666,335, the contents of which are hereby incorporated by reference in their entirety. Upon adding the slurry of raw material 10, light material having a lower specific gravity will stay towards the top of the system while higher specific gravity material may be discharged towards the bottom of econosizer 114. Material having higher than an approximately 2.5 to 2.75 specific gravity would be discharged towards the top of econosizer 114 into tanks for recovering lithium 20 along with similarly light rare earth materials such as vanadium and scandium. While lithium 20 and lighter material may float to the top of econsizer 114, coal and heavier material will sink towards a mixing or leaching tank 116. A pump or agitator may be incorporated to encourage fluid flow of the slurry mix passing through econosizer 114.

From mixing tank 116, the heavier element slurry mix may be pumped into and through cyclones or froth cells 118 so as to remove the clean coal 70 from the slurry mix. Froth floatation is a known process for selectively separating hydrophobic material from hydrophilic, and froth flotation has been used by the coal industry for some time. Clean coal 70 removed from the slurry may then be ran through plate frame presses to remove the water and place the clean coal 70 in form to be processed into a saleable product. This may include running the clean coal through a pug mill 132 and an extruder 134 where the clean coal 70 may be discharged in pellet form.

With clean coal 70 separated, the remaining material may be fed into one or more magnetic separators 122/124. A first set of ferro magnetic separators 122 may be utilized to remove metals such as iron, hematite, magnetite or other iron based metals 30. The material may then be passed to rare earth element magnetic separators 124 for removal of rare earth elements requiring a higher strength magnetic field. The system contemplates a plurality of magnetic separators 122/124 having different strength magnetic fields for separately collecting different materials, and the slurry mix may pass from separators with lower strength fields to higher strength fields. For example, the illustrated embodiment shows a low strength rare earth separator 124*a* for extracting a first type of material 40*a*, a medium strength rare earth element separator 124*b* for extracting a second type of material 40*b*, and a high strength rare earth element separator 124*c* for extracting a third type of material 40*c*, where the first material 40*a* requires a lower magnetic field intensity to achieve separation than the second material 40*b*, and the second material 40*b* requires a lower magnetic field intensity to achieve separation than the third material 40*c*. The magnetic separators may be particularly useful for removing materials such as neodymium and praseodymium used in the magnet market for telephones and space industry.

Next, the material may be passed to one or more centrifuges 126. These centrifuges may have a plurality of operating speeds including a first lower speed centrifuge 126*a* for extracting a first element 50*a* and a second higher speed centrifuge 126*b* for extracting a second element 50*b*. In one embodiment, the low speed centrifuge may be a Hutchinson Hayes® low speed centrifuge, or a suitable equivalent known or to be developed, capable of operating from five hundred to three thousand G forces. A next level, higher speed centrifuge 126*b* might operate up to twenty thousand G forces, while a yet higher speed centrifuge may operate up to fifty thousand G forces. This tiered multi-centrifuge system 126 thereby allows for separation of individual elements 50.

The remaining material may then pass to a final centrifuge system 128, which may be a centrifuge or bank or centrifuge operable at about ten thousand G forces for final separation of any remaining material from the water. The water 60 may be then pumped back into a tank or reservoir 130 for circulation into a closed loop water circuit for use with system 100, while the remaining material 80 may be applied with a thickener 136 and transferred to impoundment.

Figure 2:
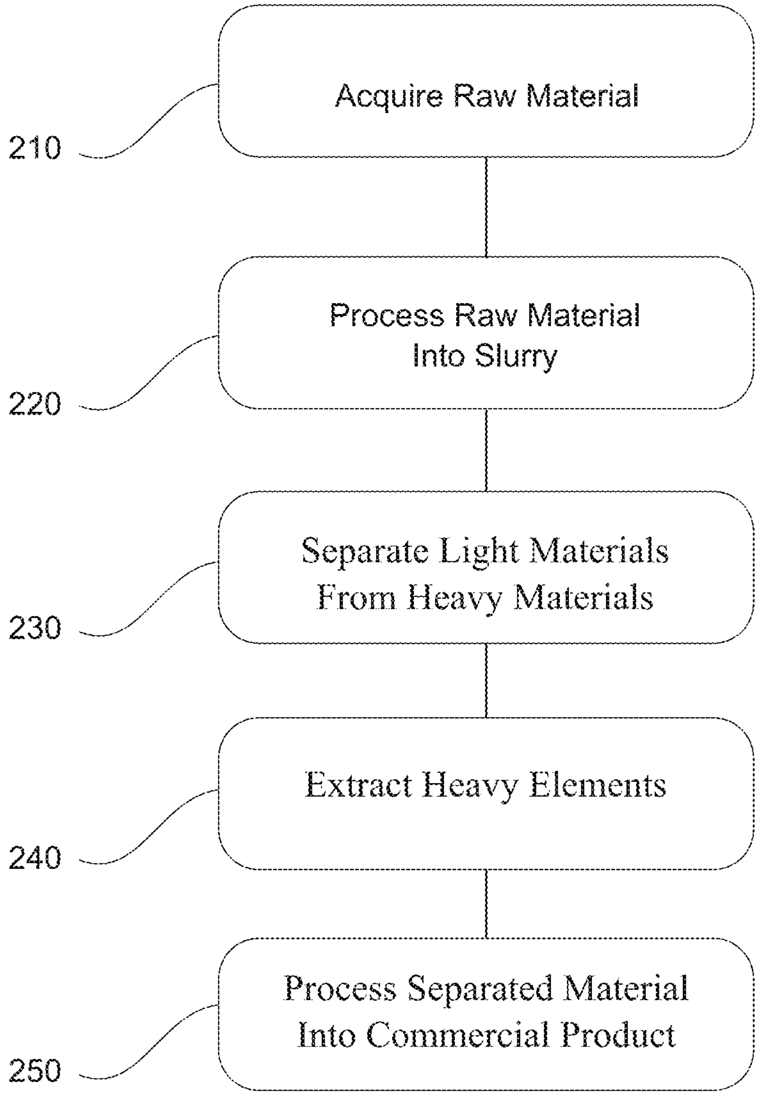
FIG. 2 illustrates a flow chart for a method for separating valuable material from raw material.

With reference to FIG. 2, a method for separating material 200 may include acquiring 210 a raw material, such as coal or another widely available mineral or material, for processing. The raw material may be processed or pulverized 220 into a micro product for introduction into water thereby creating a slurry mix. The slurry mix may be introduced 230 into an econosizer for separation of lighter materials such as lithium and lighter rare earth elements. This step may separate materials having a specific gravity between about 0.5 and about 2.75. The heavier slurry may be pumped 240 into a heavy element circuit which may include ferror magnetic separators, rare earth element separators, low speed centrifuges, diester tables, and/or high speed centrifuges. The heavy element circuit may separate materials having a specific gravity between about 2.75 to about 23. Raw material separated from the other elements, which may be clean coal, may be processed 250 into a marketable coal product such as pellets.

It should be appreciated, and is within the scope of the disclosure, to utilize every step or element or only a select few as may be desirable to extra certain elements but not others. However, embodiments of system 100 and method 200 may be utilized to recover approximately forty different elements through the various steps and components, and to separate out up to fifteen distinct elements in the process. Most of the recovered product will be in a concentrate and will range from about 40% to about 75%. This may also include precious metals and heavy metals.

Figure 3:
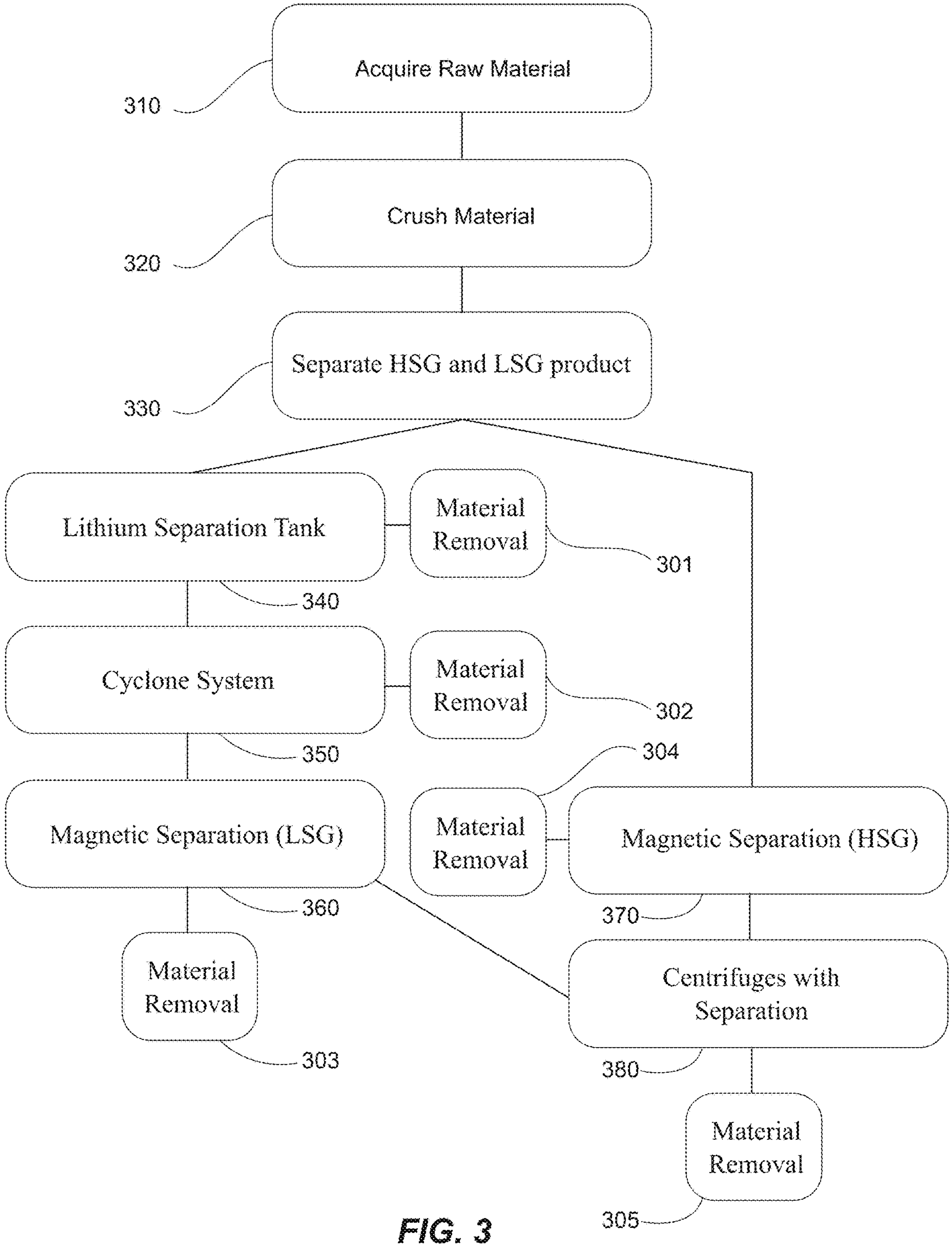
FIG. 3 illustrates a flow chart for a method for separating valuable material from raw material.

With reference to FIG. 3, a method for separating material 300 may include acquiring 310 raw material or feedstock, such as coal or another widely available mineral or material, for processing. The feedstock may be crushed or pulverized 320 by feeding the feedstock into a primary crusher that reduces the raw material in a particle size of less than ¼ inch. Oversize material may be recirculated through the primary crusher until it reaches this size. The initially crushed material may be further crushed by second crushers operable to reduce the particle size to minus 200 mesh. The fully crushed feedstock may then be separated 330 into a high specific gravity product (HSG) and a low specific gravity product (LSG) by placing the crushed material into a water bath creating a slurry mix and introducing the slurry mix into an econosizer operable to separate the HSG and LSG.

Once separated, the HSG and LSG may proceed to different processing circuits. The LSG may be placed into a lithium separation tank 340. Valuable material containing lithium, scandium, and vanadium 301 may be removed by the lithium separation tank and sent to a processing facility. The remainder of the material may then be pumped into a cyclone system 350, which may be a dual cyclone. The cyclone system 350 may be operable to remove carbon particulate matter (CPM) 302 which may be pumped to a plate frame press extruder for processing and transport to a customer. The remainder of the material from the LSG circuit may be pumped to a series of magnets 360 having varying strength as needed to separate different material. First and second magnets of the LSG magnets 360 may remove ferrous material 303, which can be sent to plate frame press for processing and transport to a customer. A third magnet may remove rare earth elements 303. At this point, the remainder of the LSG material may rejoin the HSG material in the HSG circuit and the centrifuge 380 step.

After separation from the LSG, the HSG material may be sent to a series of magnets 370 for processing. In one embodiment, three HSG magnets 370 may be utilized with the first two magnets operable to separate ferrous material 304 while the third magnet may be operable to separate rare earth elements 304, which the separated material 304 being processed and transported to the respective customers. The remainder of the HSG material may be pumped into a bank of centrifuges 380. In one embodiment, four centrifuges having progressively higher separation speeds may be utilized, and the remainder of the LSG material may added to the fourth centrifuge. A wave table may be utilized to separate material into a plurality of final, high value material products 305 to be processed and sent to respective customers. Any remaining low value material 305 may also be processed, into pellet form for instance, and sent to customers. Water utilized to create the slurry may be recycled through a system operating in accordance with the method of separation, thereby avoiding water waste.

Figure 4:
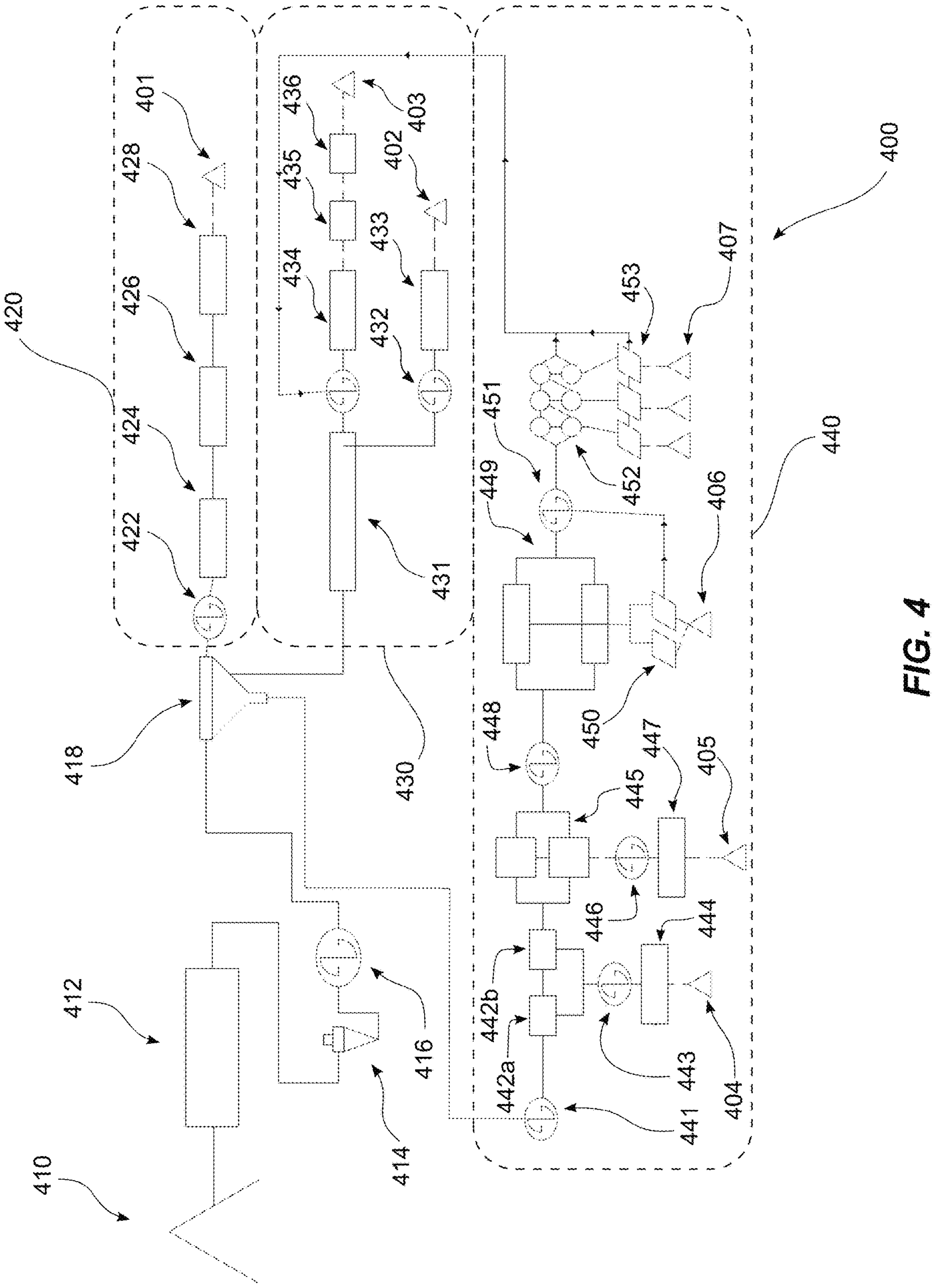
FIG. 4 illustrates an embodiment of a material separation system.
Figure 5:
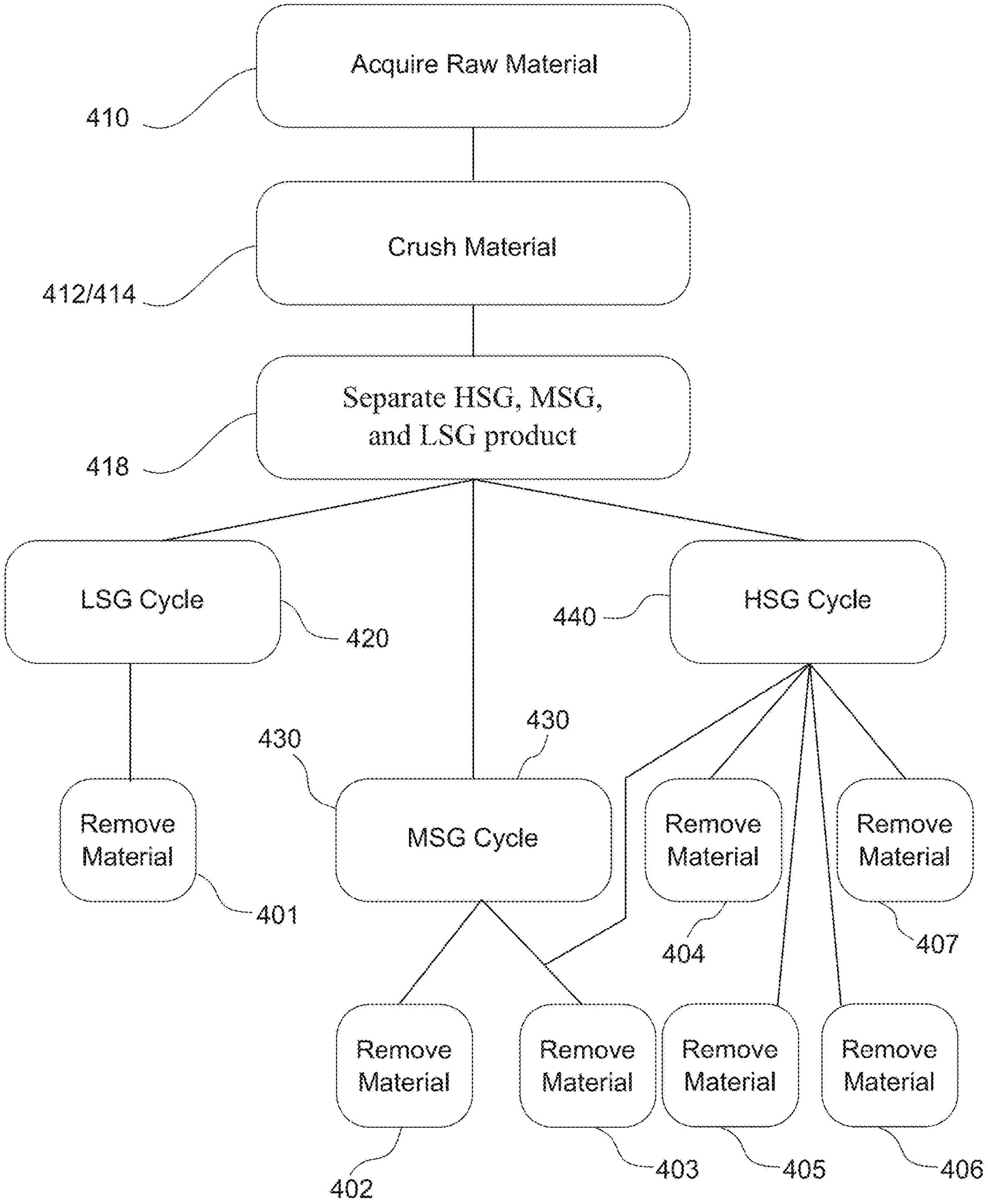
FIG. 5 illustrates a flow chart for a method for separation valuable material from raw material in accordance with the material separation system of FIG. 4.

Referring now to FIGS. 4 and 5, an embodiment of a material separation system 400 may begin with collecting feedstock or raw material 410 and feeding feedstock 410 into primary crushers 412 resulting in feedstock 410 being crushed to a particle size of minus ¼ inch material or smaller. Oversize material may be continuously recirculated through crusher 412. The crushed material may then be fed into a puliverizer or air crusher 414 with a resulting particle size of minus 300 mesh. The fine feedstock may proceed into a water bath and mixing tank 416 to create a slurry as a method of transport through the remainder of system 400.

The slurry mixture may then be pumped into an embodiment of an econosizer 418 for specific gravity separation. This may result in separation of LSG product into LSG circuit 420, medium specific gravity ("MSG") product into MSG circuit 430, and HSG product into HSG circuit 440.

LSG product may be extracted from at or near the top of econosizer 418 and transported to a LSG circuit 420. The LSG circuit 420 may begin with a mixing tank 422, then the LSG product may be pumped to a plate frame press 424, then a pug mill 426, and finally to an extruder 428 for processing, packaging, and a transport of the recovered LSG product 401, which may be CPM product.

MSG product may be extracted from at or near the middle of econosizer 418 and transported to a MSG circuit 430. The MSG circuit 430 may commence with an embodiment of a lithium tank 431. Separation of a first MSG material may include lithium, scandium, and vanadium 402. This first MSG material 402 may be pumped into a mixing tank 432, then to a plate frame press 433 to dewater and package—for transport. The remainder of the material 403 may include a concrete additive 403. This concrete additive may be pumped to a mixing tank 434, then to a plate frame press 435, and an extruder 436 for processing, packaging, and transport to a customer.

HSG product may be extracted from at or near the bottom of econisizer 418 and pumped to HSG circuit, which may begin with a mixing tank 441. The HSG product may then proceed to a series of magnets, beginning with a first magnet 442*a* and a second magnet 442*b*, each respectively having a first and second level of magnetism for removing ferrous material. The magnetism level may vary to attract different types of ferrous material 404 having different magnetic strengths. Ferrous material 404 may be pumped to a mixing tank 443 and then to a plate frame press 444 for packaging and transport. Exemplary ferrous material 404 may include iron, hermatite, and magnetite.

Material remaining after exposure to first and second magnets 442*a*, 442*b* may be pumped to a third magnet 445, which in one embodiment may be a wet high-intensity magnetic separator (WHIMS) operable to magnetically separate rare earth elements 405 that did not respond to first and second magnets 442*a*, 442*b*. Rare earth elements 405 may be pumped as a concentrate to a mixing tank 446 and then a plate press 447 for packaging and transport.

The remainder of the material after exposure to magnets 442*a*, 442*b*, 445 may then pass to another mixing tank 448 and then on to one or more concentrators 449 operable to separate extremely heavy material and send that extremely heavy material to separation tables 450 resulting in production of a precious metal concentrate 406.

Material remaining after concentrator 449 and separation tables 450 may be pumped to a tank 451 and on to one or more centrifuges 452. In on embodiment, multiple sets of twin centrifuges 452 may be provided in a series for separation of the remaining material by specific gravity. Separated material may be pumped to a separation table 453, or a series of separation tables 453, to continue to separate the product. In one embodiment, at least four products 407 are extracted and prepared for transport at this centrifuge separation stage including concentrates of battery metals, light rare earth element (LREE), heavy rare earth elements (HREE), precious metals, or other minerals of intrinsic value. Material still remaining may be recycled into the portion of MSG circuit resulting in the production of concrete additive 403.

Figure 6:
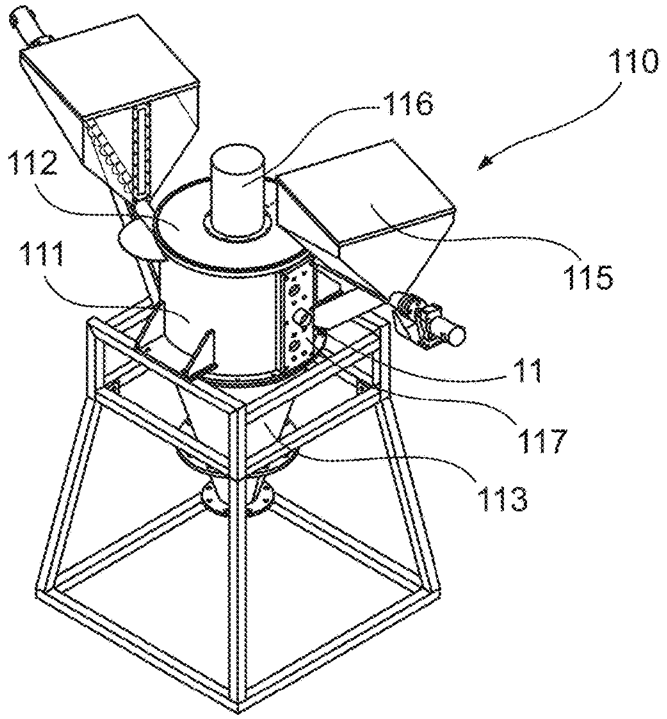
FIG. 6 illustrates a top perspective of an embodiment of an air crusher in accordance with the methods and systems of the disclosure.
Figure 7:
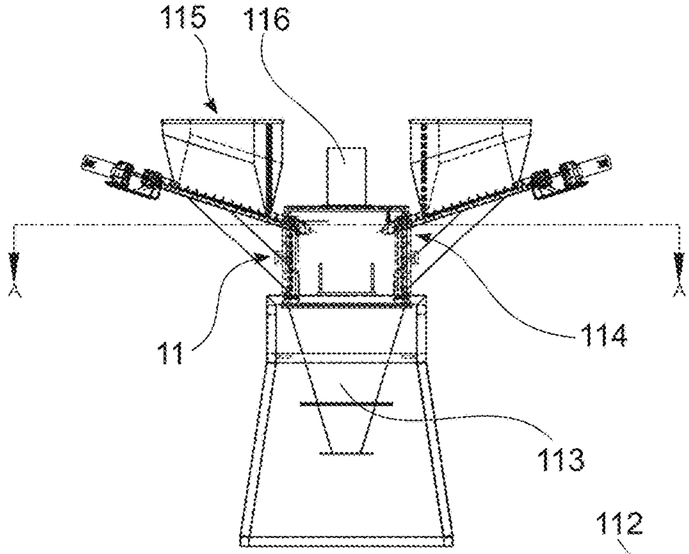
FIG. 7 illustrates a side cross-sectional view of the air crusher of FIG. 6.
Figure 8:
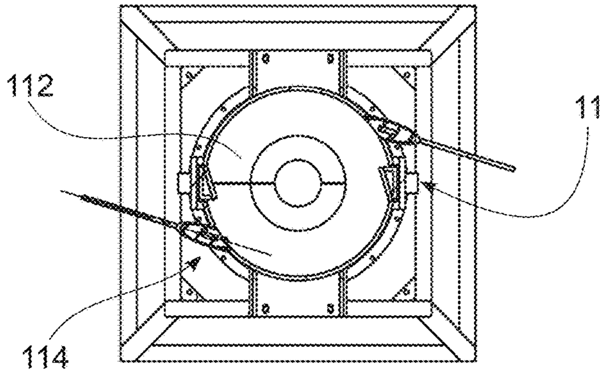
FIG. 8 illustrates a top cross-sectional view of the air crusher along line A-A identified in FIG. 7.

FIGS. 6-8 illustrates an embodiment of an air crusher 110 operable to reduce coal or other raw material 10 to very small particles at least minus 300 mesh and preferably minus 325 mesh to 400 mesh. Crusher 110 may generally include an upper chamber 111, where material 10 to be crushed along with compressed air 11 are mutually introduced, and a lower chamber 113. Upper chamber 111 may include a top enclosure plate 112 with an exhaust pipe 116. Air knives 117 may be provided along upper chamber 111 for introduction of compressed air. In some embodiments, including the illustrated embodiment, air knives 117 may be a deflection plate with extremely small cross-sectional areas that force compressed air 11 to flow in a clockwise or counterclockwise direction thereby creating a high-speed vortex inside of upper chamber 111. For example, holes for introduction of compressed air 11 may be less than one inch in diameter and preferably between about half an inch and an inch in diameter. Larger holes may also be provided, for example to encourage vortex creation. In one embodiment, larger holes are about 1.63 inches in diameter while smaller holes are 0.63 inches in diameter. Moreover, each of these holes may be angled and/or tapered again to encourage propagation of a cyclone. One or more hoppers 115 may be provided for introduction of material 10 into the upper chamber 111, and the rate of the introduction may be controlled by a valve 114, which in one embodiment might be a rotary valve. A lower chamber 113 may be conically shaped with an opening at its apex.

Consequentially, the injected material 10 is tumbled against itself and pulverized into a fine powder while simultaneously dehydrating the resultant product. Exhaust pipe 116 be selectively opened or closed to force both air 11 and material 10 downwards into a lower chamber 113. If the compressed air 11 is directed in a counter-clockwise direction, the resultant product may be forced downwards from upper chamber 111 to lower chamber 113. Resultant material sizing can be controlled by selectively adjusting air pressure as well as through valve control as described herein.

One aspect of the systems and methods described herein is the ability of the system to reduce raw material to very fine particles. If the raw material particle size is too large, the ability to extract valuable materials, particularly rare earth elements, is severely diminished. Accordingly, the ability for embodiments of the disclosure to reduce raw particle size to a fine powder is one significant improvement of the disclosed embodiments over known efforts to extract valuable materials. Accordingly, it is advantageous to utilizing crushing or pulverizing devices and methods of the disclosure to produce a fine powder having size range from 60 mesh (250 microns or 0.25 mm) to less than 400 mesh (37 microns or 0.037 mm), preferably 200 mesh or finer (53 microns or 0.053 mm), and even more preferably 300 mesh or finer (74 microns or 0.074 mm). As discussed later, the inventors targeted 325 mesh in experimental embodiments. Product larger than 60 mesh likely will be insufficient in the exposure, and subsequent ability to separate, valuable material particularly found within the HSG product as described in certain embodiments herein. Stated another way, if the product is not fine enough, some valuable material to be extracted will not be separatable from the other material.

The inventors have operated experimental embodiments of the system and methods disclosed herein to great success. For example, where the raw material is unprocessed or refined coal, clay, shale and mixtures thereof, embodiments of systems and methods successful recovered significant quantities of numerous types of valuable material. Per ton of this sample, raw material, an embodiment of the system recovered approximately the following quantities of valuable material: about 288 grams of cerium per of ton of raw material; about 78 grams of cobalt per ton of raw material; about 743 grams of copper per ton of raw material; about 15 grams of dysprosium per ton of raw material; about 5 grams of europium per ton of raw material; about 4 grams of gold per ton of raw material; about 3 grams of holmium per ton of raw material; about 145 grams of lanthanum per ton of raw material; about 180 grams of lead per ton of raw material; about 375 grams of lithium per ton of raw material; about 1.4 grams of lutetium per ton of raw material; about 135 grams of neodymium per ton of raw material; about 270 grams of Nickel per ton of raw material; about 6 grams of palladium per ton of raw material; about 35 grams of praseodymium per ton of raw material; about 0.4 grams of rhodium per ton of raw material; about 26 grams of samarium per ton of raw material; about 180 grams of scandium per ton of raw material; about 35 grams of silver per ton of raw material; about 3 grams of terbium per ton of raw material; about 1.3 grams of thulium per ton of raw material; about 1 kilogram of vanadium per ton of raw material; about 75 grams of yttrium per ton of raw material; and about 1 kilogram of zinc per ton of raw material. Process yields are varied with each specific element from 56% to 83%, with an average yield of 71%. The various types of valuable material were recovered in accordance with the embodiments of systems and methods described herein. For example: lithium, scandium, and vanadium were recovered from an embodiment of a lithium tank; iron, hematite, and magnetite were recovered from an embodiment of magnets; neodymium, praseodymium, and samarium were recovered from an embodiment of a WHIMS; gold, silver, palladium, rhodium, and lead were recovered from an embodiment of a first table; terbium, dysprosium, holmium, thulium, and lutetium were recovered from an embodiment of a second table; yttrium, lanathanum, cerium, europium, and gadolinium were recovered from an embodiment of a third table; and zinc, cobalt, nickel, and copper were recovered from an embodiment of a fourth table. Also, in accordance with the systems and methods disclosed, coal/carbon product and a cement additive product were also removed in significantly higher quantities than valuable materials whose quantities were provided. The target mesh size for crushing the raw material was 325 mesh from the examples in this paragraph.

The descriptions set forth above are meant to be illustrative and not limiting. Various modifications to the disclosed embodiments, in addition to those described herein, will be apparent to those skilled in the art from the foregoing description. Such modifications are also intended to fall within the scope of the concepts described herein. The disclosures of each patent, patent application, and publication cited or described in this document are hereby incorporated herein by reference, in their entireties.

The foregoing description of possible implementations consistent with the present disclosure does not represent a comprehensive list of all such implementations or all variations of the implementations described. The description of some implementations should not be construed as an intent to exclude other implementations described. For example, artisans will understand how to implement the disclosed embodiments in many other ways, using equivalents and alternatives that do not depart from the scope of the disclosure. Moreover, unless indicated to the contrary in the preceding description, no particular component described in the implementations is essential to the invention. It is thus intended that the embodiments disclosed in the specification be considered illustrative, with a true scope and spirit of invention being indicated by the following claims.

What is claimed:

1. A system for separating a plurality of valuable materials from a raw material, the system comprising:

one or more crushers for reducing the raw material to a crushed material being 60 mesh or finer in size;

a mixing tank for combining the crushed material with water to produce a slurry;

an econosizer for separating higher specific gravity material from lower specific gravity material within the slurry;

a low specific gravity circuit for extracting a first valuable material from the low specific gravity material;

a high specific gravity circuit for extracting a second valuable material from the higher specific gravity material; and a medium specific gravity circuit for extracting a third valuable material from a medium specific gravity material separated from the econosizer, wherein the high specific gravity circuit is for further extracting a fourth valuable material, and the high specific gravity circuit further includes a first magnet having sufficient magnetic strength to forcibly separate the second valuable material from the slurry but not the third valuable material, and the second magnet having sufficient magnetic strength to forcibly separate the fourth valuable material from the slurry.

2. The system of claim 1, wherein the crushed material is 325 mesh or finer in size.

3. The system of claim 2, wherein the one or more crushers includes an air crusher.

4. The system of claim 1, wherein the medium specific gravity circuit includes a lithium tank and the third valuable material is lithium, scandium, or vanadium.

5. The system of claim 1, wherein the second magnet is a wet high intensity magnetic separator, wherein the second valuable material is ferrous material, and wherein the fourth valuable material is a rare earth element.

6. The system of claim 5, wherein the high specific gravity circuit is for further extracting a fifth valuable material, and the high specific gravity circuit further includes a centrifuge operable to separate the fifth valuable material from the slurry after passing through the first and second magnets.

7. The system of claim 6, wherein the fifth valuable material is a light rare earth element, a heavy rare earth element, or a precious metal.

8. The system of claim 1, wherein the raw material is coal.

9. A method for separating a plurality of valuable materials from a raw material, the method comprising:

crushing the raw material to a size of 60 mesh or finer;

creating a slurry from the crushed raw material and water;

separating high specific gravity material, medium specific gravity material, and low specific gravity material from the slurry through an econosizer;

processing the low specific gravity material through a low specific gravity circuit in order to extract a first valuable material;

processing the high specific gravity material through a high specific gravity circuit in order to extract a second valuable material; and processing the medium specific gravity material though a medium specific gravity circuit in order to extract a third valuable material, wherein processing the high specific gravity material is to further extract a fourth valuable material, and wherein the high specific gravity circuit includes a first magnet having sufficient magnetic strength to forcibly separate the second valuable material from the slurry but not the third valuable material, and the second magnet having sufficient magnetic strength to forcibly separate the fourth valuable material from the slurry.

10. The method of claim 9, wherein the crushing the raw material crushes the raw material to a size of 325 mesh or finer.

11. The method of claim 10, wherein the crushing occurs by an air crusher.

12. The method of claim 9 wherein the medium specific gravity circuit includes a lithium tank, and the third valuable material is lithium, scandium, or vanadium.

13. The method of claim 9, wherein the second magnet is a wet high intensity magnetic separator, the second valuable material is ferrous material, and the fourth valuable material is a rare earth element.

14. The method of claim 13, wherein processing the high specific gravity material is to further extract a fifth valuable material, and the high specific gravity circuit further includes a centrifuge operable to separate the fifth valuable material from the slurry after passing through the first and second magnets.

15. The method of claim 14, wherein the fifth valuable material is a light rare earth element, a heavy rare earth element, or a precious metal.

16. The method of claim 9, wherein the raw material is coal.

* * * * *